United States Patent
Barnes

(10) Patent No.: US 9,132,725 B2
(45) Date of Patent: Sep. 15, 2015

(54) VEHICLE AND HYBRID DRIVE SYSTEM

(75) Inventor: David M. Barnes, Columbus, IN (US)

(73) Assignee: Cummins Inc., Columbus, IN (US)

( * ) Notice: Subject to any disclaimer, the term of this patent is extended or adjusted under 35 U.S.C. 154(b) by 1048 days.

(21) Appl. No.: 13/103,549

(22) Filed: May 9, 2011

(65) Prior Publication Data

US 2012/0285292 A1 Nov. 15, 2012

(51) Int. Cl.
*F16H 37/06* (2006.01)
*B60K 6/48* (2007.10)

(52) U.S. Cl.
CPC ............... *B60K 6/48* (2013.01); *Y02T 10/6221* (2013.01); *Y10T 74/19126* (2015.01)

(58) Field of Classification Search
USPC .......... 74/661, 665 A–665 G, 665 GE, 665 T, 74/665 L, 665 P; 180/65, 145; 475/5; 477/15, 20
See application file for complete search history.

(56) References Cited

U.S. PATENT DOCUMENTS

| | | | |
|---|---|---|---|
| 3,732,751 A | 5/1973 | Berman et al. | |
| 4,269,280 A | 5/1981 | Rosen | |
| 4,489,242 A | 12/1984 | Worst | |
| 5,251,588 A | 10/1993 | Tsujii | |
| 5,255,733 A | 10/1993 | King | |
| 5,323,868 A | 6/1994 | Kawashima | |
| 5,531,285 A | 7/1996 | Green | |
| 5,558,173 A | 9/1996 | Sherman | |
| 5,635,805 A * | 6/1997 | Ibaraki et al. | 318/139 |
| 5,780,979 A * | 7/1998 | Kim | 318/15 |
| 5,820,172 A | 10/1998 | Bringham et al. | |
| 5,842,534 A * | 12/1998 | Frank | 180/65.25 |
| 5,924,406 A | 7/1999 | Kinugasa et al. | |
| 5,943,918 A * | 8/1999 | Reed et al. | 74/661 |
| 5,951,436 A * | 9/1999 | Kim | 477/20 |
| 5,971,092 A | 10/1999 | Walker | |
| 6,026,921 A * | 2/2000 | Aoyama et al. | 180/65.25 |
| 6,251,042 B1 * | 6/2001 | Peterson et al. | 477/3 |
| 6,334,079 B1 | 12/2001 | Matsubara et al. | |
| 6,367,570 B1 | 4/2002 | Long, III et al. | |
| 6,421,599 B1 | 7/2002 | Lippa et al. | |
| 6,464,028 B1 | 10/2002 | Imani | |
| 6,501,190 B1 | 12/2002 | Seguchi et al. | |
| 6,515,872 B2 | 2/2003 | Nakayama et al. | |
| 6,524,218 B1 * | 2/2003 | Yamada et al. | 477/5 |
| 6,598,496 B2 | 7/2003 | Pannell | |
| 6,629,026 B1 * | 9/2003 | Baraszu et al. | 701/22 |
| 6,668,953 B1 | 12/2003 | Reik et al. | |
| 6,746,366 B2 * | 6/2004 | Tamor | 477/5 |
| 6,809,429 B1 | 10/2004 | Frank | |
| 6,863,139 B2 | 3/2005 | Egami et al. | |
| 6,959,241 B2 | 10/2005 | Itow et al. | |
| 7,040,434 B2 | 5/2006 | Komiyama et al. | |

(Continued)

OTHER PUBLICATIONS

International Search Report and Written Opinion, PCT/US2012/037079, Cummins, Inc., Aug. 10, 2012.

*Primary Examiner* — Ha D Ho
(74) *Attorney, Agent, or Firm* — Taft Stettinius & Hollister LLP

(57) ABSTRACT

One embodiment is a unique vehicle having a hybrid drive system. Other embodiments include unique hybrid drive systems. Still other embodiments include apparatuses, systems, devices, hardware, methods, and combinations for fluid driven actuation systems. Further embodiments, forms, features, aspects, benefits, and advantages of the present application shall become apparent from the description and figures provided herewith.

23 Claims, 2 Drawing Sheets

(56) References Cited

U.S. PATENT DOCUMENTS

| | | |
|---|---|---|
| 7,104,920 B2 | 9/2006 | Beaty et al. |
| 7,119,454 B1 | 10/2006 | Chiao |
| 7,200,476 B2 | 4/2007 | Cawthorne et al. |
| 7,276,815 B2 | 10/2007 | Algrain et al. |
| 7,370,715 B2 * | 5/2008 | Colvin et al. ............. 180/65.28 |
| 7,391,129 B2 | 6/2008 | Chiao et al. |
| 7,398,147 B2 | 7/2008 | Kozarekar et al. |
| 7,411,312 B2 | 8/2008 | Chiao |
| 7,464,616 B2 * | 12/2008 | Leibbrandt et al. ............. 74/331 |
| 7,487,030 B2 | 2/2009 | Heap et al. |
| 7,492,055 B2 | 2/2009 | Chiao |
| 7,559,388 B2 | 7/2009 | Severinsky et al. |
| 7,582,034 B2 | 9/2009 | Usoro |
| 7,597,164 B2 | 10/2009 | Severinsky et al. |
| 7,633,247 B2 | 12/2009 | Obayashi |
| 7,695,400 B2 * | 4/2010 | McGee ............................ 477/5 |
| 7,748,483 B2 * | 7/2010 | Usoro ........................ 180/65.27 |
| 2003/0098189 A1 * | 5/2003 | Donohue et al. ............. 180/65.4 |
| 2003/0116368 A1 * | 6/2003 | Winkelman et al. ......... 180/65.2 |
| 2004/0011316 A1 | 1/2004 | Tumback et al. |
| 2006/0019785 A1 * | 1/2006 | Holmes et al. .................... 475/5 |
| 2007/0225888 A1 | 9/2007 | Morris |
| 2007/0265128 A1 * | 11/2007 | Conlon ............................ 475/5 |
| 2008/0039263 A1 | 2/2008 | Usoro |
| 2008/0051242 A1 | 2/2008 | Usoro |
| 2008/0099256 A1 | 5/2008 | Holmes et al. |
| 2008/0103679 A1 | 5/2008 | Ruiz |
| 2008/0242498 A1 * | 10/2008 | Miller et al. ...................... 477/5 |
| 2009/0101465 A1 * | 4/2009 | Hart et al. ................... 192/41 R |
| 2009/0115491 A1 | 5/2009 | Anwar et al. |
| 2009/0118090 A1 | 5/2009 | Heap et al. |
| 2009/0118969 A1 | 5/2009 | Heap et al. |
| 2009/0074682 A1 | 8/2009 | Anwar et al. |
| 2009/0195093 A1 | 8/2009 | Bandai et al. |
| 2009/0195203 A1 | 8/2009 | Yurgil |
| 2009/0205588 A1 | 8/2009 | Bilezikjian et al. |
| 2009/0253550 A1 * | 10/2009 | Reinhart et al. .................. 477/3 |
| 2011/0065543 A1 * | 3/2011 | Usoro .............................. 475/5 |
| 2012/0285292 A1 * | 11/2012 | Barnes ........................ 74/665 L |

* cited by examiner

VEHICLE AND HYBRID DRIVE SYSTEM

FIELD OF THE INVENTION

The present invention relates to vehicles, and more particularly, to vehicles having hybrid drive systems.

BACKGROUND

Hybrid drive systems that effectively drive accessories under various operating conditions, remain an area of interest. Some existing systems have various shortcomings, drawbacks, and disadvantages relative to certain applications. Accordingly, there remains a need for further contributions in this area of technology.

SUMMARY

One embodiment of the present invention is a unique vehicle having a hybrid drive system. Other embodiments include unique hybrid drive systems. Still other embodiments include apparatuses, systems, devices, hardware, methods, and combinations for fluid driven actuation systems. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
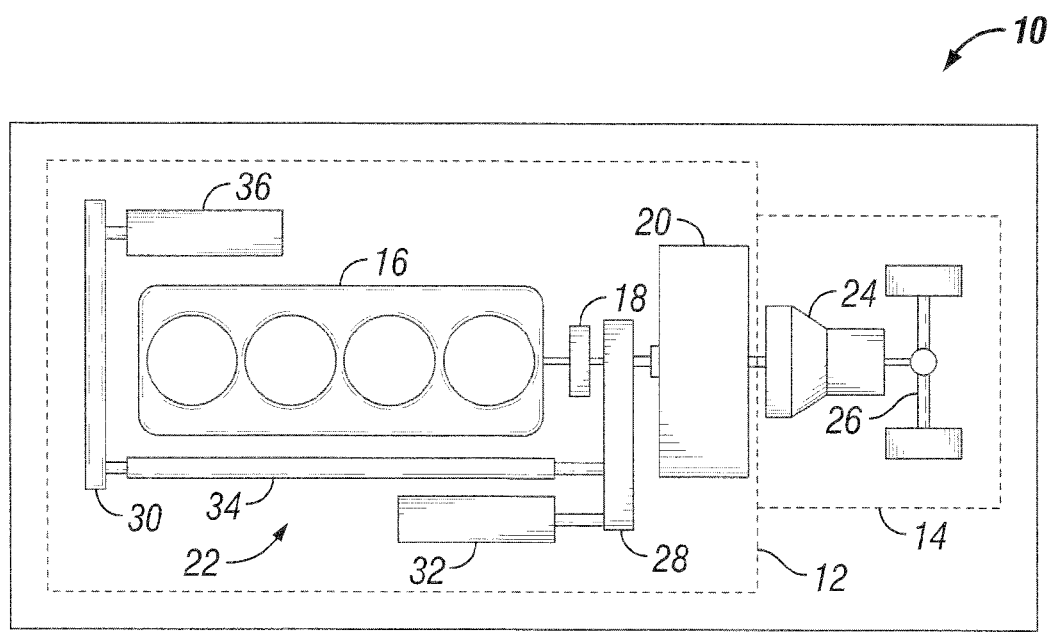
FIG. 1 schematically illustrates some aspects of a non-limiting example of a vehicle with a hybrid drive system in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, a non-limiting example of some aspects of a vehicle 10 in accordance with an embodiment of the present invention is schematically depicted. In one form, vehicle 10 is an over-the-road truck. In other embodiments, vehicle 10 may take other forms, and may be, for example and without limitation, an agricultural, construction and/or forestry vehicle, or may be a passenger vehicle such as an automobile, or a utility vehicle or pick-up truck. Vehicle 10 includes a hybrid drive system 12 and a drive train 14. In one form, hybrid drive system 12 is a hybrid vehicle drive system operative to provide propulsive power for vehicle 10. In other embodiments, hybrid drive system 12 may be employed to power other machines or systems. Hybrid drive system 12 is coupled to drive train 14 and operative to provide mechanical shaft power to drive train 14 for powering vehicle 10.

Hybrid drive system 12 includes a combustion engine 16, a clutch 18, an electrical machine 20 and an accessory drive system 22. Drive train 14 includes a transmission 24 and a vehicle drive axle 26. Transmission 24 is coupled to electrical machine 20 and to drive axle 26. Transmission 24 is operative to transmit power from hybrid drive system 12 to drive axle 26 for powering vehicle 10. Transmission 24 may take any convenient form, and may be, for example and without limitation, a manual transmission, an automatic transmission, a hydrostatic transmission or any other type of transmission suitable for transmitting power to a drive axle of a vehicle. Drive axle 26 may take any convenient form, e.g., a differential drive train or a hydrostatic drive suitable for receiving power from transmission 24 and applying tractive effort for vehicle 10.

In one form, combustion engine 16 is Diesel engine. In other embodiments, combustion engine 10 may take other forms, and may be, for example and without limitation, a gasoline engine or a gas turbine engine. Electrical machine 20 is configured to convert electrical power into mechanical power. The electrical power may be supplied to electrical machine 20 from, for example and without limitation, a battery (not shown); a fuel cell (not shown); or another electrical machine, such as a generator (not shown). In one form, electrical machine 20 is also configured to convert mechanical power into electrical power. For example, in one form, electrical machine 20 is a motor/generator. In other embodiments, electrical machine 20 may take other forms.

Electrical machine 20 is coupled to combustion engine 16. In one form, electrical machine 20 is coupled to engine 16 via clutch 18 in a series arrangement configured to transmit mechanical power to drive train 14 in series with electrical machine 20. Electrical machine 20 is coupled to drive train 14, and is operative to transmit propulsive power to drive train 14. Combustion engine 16 is configured to transmit propulsive power to drive train 14 via electrical machine 20. In one form, electrical machine 20 is coupled to transmission 24. Transmission 24 is operative to transmit power from combustion engine 16 and electrical machine 20 to drive axle 26. In other embodiments, electrical machine 20 may be coupled to one or more other drive train components of a vehicle, such as vehicle 10.

Clutch 18 is coupled to both combustion engine 16 and electrical machine 20. In one form, clutch 18 is configured to selectively engage combustion engine 16 with electrical machine 20, and to disengage combustion engine 18 from electrical machine 20, e.g., in response to a control signal or other actuation/de-actuation arrangement. When clutch 18 is actuated, combustion engine 16 is engaged with electrical machine 20 so that the power output of combustion engine 16 may be transmitted to transmission 24. When clutch 18 is de-actuated, combustion engine 16 is disengaged from electrical machine 20, e.g., so that the rotational speed of electrical machine 20 may vary without regard to rotation of combustion engine 16. In one form, clutch 18 is an actuatable multi-plate wet clutch. In other embodiments, clutch 18 may be any actuatable clutch. In still other embodiments, clutch 18 may be an overrunning clutch, such as a sprag clutch. In one form, hybrid drive system 12 is configured to start combustion engine 16 by actuating clutch 18 and causing electrical machine 20 to rotate or to continue to rotate. In some embodiments, the rate at which clutch 18 is actuated (engaged) may be varied in order to control the rate of acceleration of combustion engine 16 during the starting process. In other embodiments, combustion engine 16 may be started by other means, for example and without limitation, a conventional starter motor.

In various embodiments, hybrid drive system 12 is configured to selectively supply mechanical power to accessory drive system 22 from a selected one or both of combustion engine 16 and electrical machine 20. The selection of the power source as being combustion engine 16 and/or electrical machine 20 may be made, for example, by a controller (not shown) in response to vehicle 10 operating conditions and/or other conditions. In one form, accessory drive system 22 is coupled to both clutch 18 and electrical machine 20. Accessory drive system 22 is configured to drive at least one accessory. In one form, accessory drive system 22 is configured to drive a plurality of accessories, e.g., one or more air compressors, hydraulic pumps, alternators or other conventional or nonconventional accessories that may be referred to as "engine-driven accessories." Accessory drive system 22 is coupled to electrical machine 20. Hybrid drive system 12 is configured to supply mechanical power to accessory drive system 22 from combustion engine 16 by engaging clutch 18 and rotating combustion engine 16. In addition, hybrid drive system 12 is configured to supply mechanical power to accessory drive system 22 from electrical machine 20 by disengaging clutch 18 and rotating electrical machine 20. In some embodiments, power may also be supplied to drive accessory drive system 22 from electrical machine 20 while clutch 18 is engaged; in such embodiments, power may be supplied to accessory drive system from both electrical machine 20 and combustion engine 16, and/or power may be supplied from electrical machine 20 to rotate combustion engine 16 (or to increase its rate of rotation) while electrical machine 20 also powers accessory drive system 22.

In various embodiments, accessory drive system 22 may be bifurcated into a plurality of accessory drive trains. In other embodiments, only a single accessory drive train may be employed. In one form, accessory drive system 22 is bifurcated into an accessory drive train 28 and an accessory drive train 30. Accessory drive train 28 is coupled to electrical machine 20. In various embodiments, one or more accessories 32 are coupled directly to and driven by accessory drive train 28. In one form, accessory drive train 28 is a gear drive. In other embodiments, accessory drive train 28 may take other forms or include other forms, e.g., a belt drive, a friction drive, a harmonic drive and/or one or more other drive types. In one form, accessory 32 is a gear-driven accessory. In other embodiments, accessory 32 may take other forms, and may be, for example and without limitation, a belt-driven accessory or a shaft driven accessory.

In one form, accessory drive train 30 is coupled to electrical machine 20 via accessory drive train 28 and a shafting system 34. Shafting system 34 is operative to transmit power from accessory drive train 28 to accessory drive train 30. In other embodiments, accessory drive train 30 may be coupled directly to electrical machine 20 or may be coupled to electrical machine 20 via other means. In various embodiments, one or more accessories 36 are coupled to and driven by accessory drive train 30. In one form, accessory drive train 30 is a belt drive. In other embodiments, accessory drive train 30 may take other forms or include other forms, e.g., a gear drive, a friction drive, a harmonic drive and/or one or more other drive types. In one form, accessory 36 is a belt-driven accessory. In other embodiments, accessory 36 may take other forms, and may be, for example and without limitation, a gear-driven accessory or a shaft driven accessory.

Figure 2:
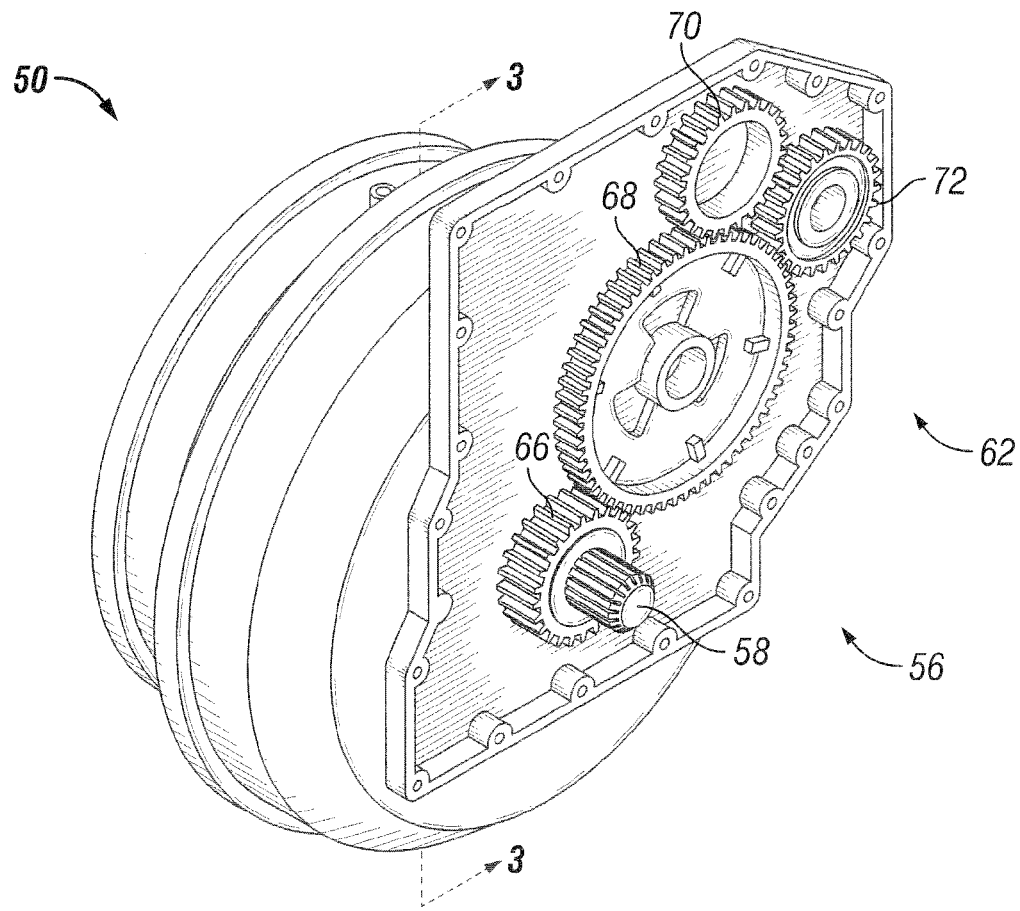
FIG. 2 illustrates some aspects of a hybrid drive system in accordance with an embodiment of the present invention.
Figure 3:
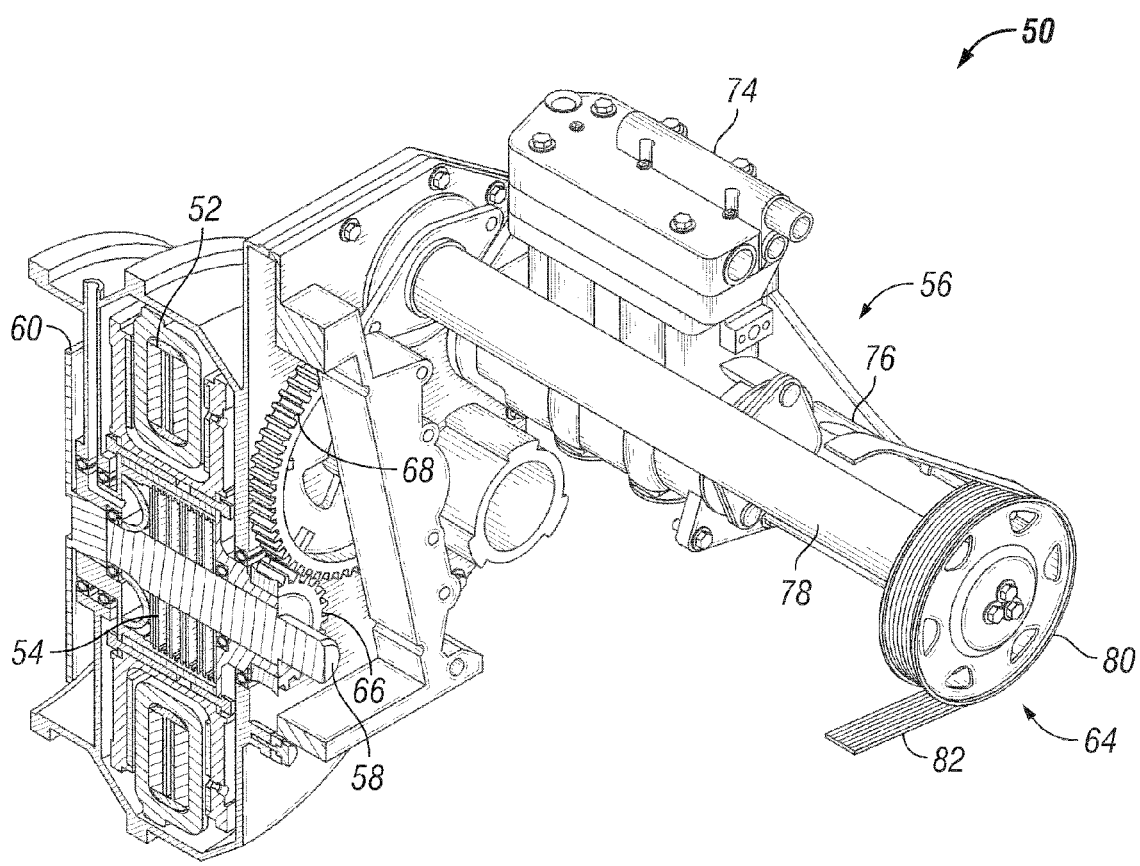
FIG. 3 illustrates a partial isometric cross-sectional view of the hybrid drive system of FIG. 3.

Referring to FIGS. 2 and 3, a non-limiting example of some aspects of an embodiment of a hybrid drive system 50 is depicted. Hybrid drive system 50 is similar to hybrid drive system 12 described above, and hence, the description of hybrid drive system 12, set forth above, applies to hybrid drive system 50. Like hybrid drive system 12, hybrid drive system 50 is configured, in various embodiments, to selectively supply mechanical power to an accessory drive system from a selected one or both of a combustion engine (not shown) and an electrical machine.

Illustrated components of hybrid drive system 50 include an electrical machine in the form of a motor/generator (M/G) 52; a clutch 54 nested within M/G 52; and an accessory drive system 56. Hybrid drive system 50 includes a crank spline 58 and a flex-plate 60. Crank spline 58 is configured to couple M/G 52 and clutch 54 to an engine, such as an internal combustion engine (not shown). Flex-plate 60 is configured to couple M/G 52 to a drive train component, such as a transmission (not shown).

Accessory drive system 56 includes a gear drive 62 and a belt drive 64. Gear drive system 62 includes a M/G 52 output gear 66, an idler gear 68, a belt drive gear 70 and an air compressor gear 72. Gear drive 62 is operative to drive an air compressor 74 via air compressor gear 72, and to drive a hydraulic pump 76 via air compressor 74. Belt drive 64 is coupled to gear drive 62 via a belt driveshaft 78. Illustrated components of belt drive 64 include an input pulley 80 and a drive belt 82 that are operative to drive one or more accessories.

In one form, M/G 52 is coupled to the combustion engine via clutch 54 in a series arrangement configured to transmit mechanical power to the drive train in series with M/G 52. M/G 52 is coupled to the transmission, and is operative to transmit propulsive power to the transmission. Clutch 54 is coupled to both the combustion engine and M/G 52. In one form, clutch 54 is configured to selectively engage the combustion engine with M/G 52, and disengage the combustion engine from M/G 52, e.g., in response to a control signal or another actuation/de-actuation control arrangement. When clutch 54 is actuated, the combustion engine is engaged with M/G 52 so that the power output of the combustion engine may be transmitted to the transmission. When clutch 54 is de-actuated, the combustion engine is disengaged from M/G 52, e.g., so that the rotational speed of M/G 52 may vary without regard to rotation of the combustion engine. In one form, clutch 54 is an actuatable multi-plate wet clutch. In other embodiments, clutch 54 may be any actuatable clutch. In still other embodiments, clutch 54 may be an overrunning clutch, such as a sprag clutch. In one form, hybrid drive system 50 is configured to start the combustion engine by actuating clutch 54 and rotating M/G 52. In some embodiments, the rate at which clutch 54 is actuated (engaged) may be varied in order to control the rate of acceleration of the combustion engine during the starting process. In other embodiments, the combustion engine may be started by other means, for example and without limitation, a conventional starter motor.

In various embodiments, hybrid drive system 50 is configured to selectively supply mechanical power to accessory drive system 56 from a selected one or both of the combustion engine and M/G 52. The selection of the power source as being the combustion engine 16 and/or M/G 52 may be made, for example, by a controller (not shown). Hybrid drive system 50 is configured to supply mechanical power to accessory drive system 56 from the combustion engine by engaging clutch 54. In addition, hybrid drive system 50 is configured to supply mechanical power to accessory drive system 56 from M/G 52 by disengaging clutch 54 and rotating M/G 52. In some embodiments, power may also be supplied to drive accessory drive system 56 from M/G 52 while clutch 54 is engaged; in such embodiments, power may be supplied to accessory drive system from both M/G 52 and the combustion engine, and/or power may be supplied from M/G 52 to rotate the combustion engine (or to increase its rate of rotation) while M/G 52 also powers accessory drive system 56.

Embodiments of the present invention include a vehicle, comprising: a drive train including a transmission and a drive axle; and hybrid vehicle drive system, including: a combustion engine; a clutch; an electrical machine coupled to the combustion engine via the clutch, wherein the transmission coupled to the electrical machine; and wherein the transmission is operative to transmit power from the combustion engine and the electrical machine to the drive axle; and an accessory drive system coupled to the electrical machine and configured to drive at least one accessory, wherein the hybrid vehicle drive system is configured to supply mechanical power to the accessory drive system from the combustion engine by engaging the clutch; and wherein the hybrid vehicle drive system is configured to supply mechanical power to the accessory drive system from the electrical machine by disengaging the clutch.

In a refinement, the accessory drive system includes means for driving a plurality of accessories.

In another refinement, the accessory drive system is operative to drive a plurality of accessories; and wherein the accessory drive system includes a first accessory drive train coupled to the electrical machine; a second accessory drive train coupled to at least one accessory of the plurality of accessories and configured to drive the at least one accessory; and means for transmitting power from the first accessory drive train to the second accessory drive train.

In yet another refinement, the first accessory drive train is a gear drive.

In still another refinement, the first accessory drive train is coupled to at least another accessory of the plurality of accessories and configured to drive the at least another accessory.

In yet still another refinement, the second accessory drive train is a belt drive.

In a further refinement, the means for transmitting includes a shaft coupling the second accessory drive train to the first accessory drive train and operative to supply power from the first accessory drive train to the second accessory drive train.

In a yet further refinement, the accessory drive system is coupled to both the clutch and the electrical machine.

In a still further refinement, the electrical machine is configured to both convert mechanical power to electrical power and to convert electrical power to mechanical power.

Embodiments of the present invention include a hybrid drive system for powering a drive train, comprising: an electrical machine coupled to the drive train and operative to transmit power to the drive train; a combustion engine arranged to transmit power to the drive train in series with the electrical machine; and an accessory drive system coupled to the electrical machine and configured to drive at least one accessory, wherein the hybrid drive system is configured to selectively supply mechanical power to the accessory drive system from a selected one or both of the electrical machine and the combustion engine.

In a refinement, the hybrid drive system is configured to selectively supply mechanical power to the drive train from a selected one or both of the electrical machine and the combustion engine.

In another refinement, the hybrid drive system is configured to start the combustion engine using the electrical machine.

In yet another refinement, the hybrid drive system is configured to selectively engage and disengage the combustion engine from the electrical machine.

In still another refinement, the hybrid drive system further comprises a clutch coupled to both the combustion engine and the electrical machine, wherein the clutch is configured to selectively engage and disengage the combustion engine from the electrical machine.

In yet still another refinement, the accessory drive system is configured to drive a plurality of accessories.

In a further refinement, the accessory drive system is bifurcated into a first accessory drive train and a second accessory drive train; wherein the accessory drive system is configured to drive a first subset of the plurality of accessories with the first accessory drive train; and wherein the accessory drive system is configured to drive a second subset of the plurality of accessories with the second accessory drive train.

In a yet further refinement, the first subset includes a gear-driven accessory; wherein the second subset includes a belt-driven accessory; wherein the first accessory drive train includes a gear drive configured to drive the gear-driven accessory; and wherein the second accessory drive train includes a belt drive configured to drive the belt-driven accessory.

Embodiments of the present invention include a hybrid drive system, comprising: an electrical machine; a combustion engine arranged in series with the electrical machine; an accessory drive system coupled to the electrical machine and configured to drive at least one accessory; and means for directing mechanical power to the accessory drive system when the combustion engine is running and for directing mechanical power to the accessory drive system when the combustion engine is not running.

In a refinement, the means for directing includes a clutch disposed between the combustion engine and the electrical machine.

In another refinement, the clutch is configured to selectively engage and disengage the combustion engine from the electrical machine.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A vehicle, comprising:
a drive train including a transmission and a drive axle; and a hybrid vehicle drive system, including:
  a combustion engine;
  a clutch;
  an electrical machine coupled to the combustion engine via the clutch;
  the electrical machine further being directly coupled to the transmission without an intervening clutch, wherein the transmission is operative to transmit power from the combustion engine and the electrical machine to the drive axle; and
  an accessory drive system coupled to the electrical machine and configured to drive at least one accessory,
  wherein the hybrid vehicle drive system is configured to supply mechanical power to the accessory drive system from the combustion engine by engaging the clutch; and wherein the hybrid vehicle drive system is configured to supply mechanical power to the accessory drive system from the electrical machine by disengaging the clutch.

2. The vehicle of claim 1, wherein the accessory drive system includes means for driving a plurality of accessories.

3. The vehicle of claim 1, wherein the accessory drive system is operative to drive a plurality of accessories; and wherein the accessory drive system includes a first accessory drive train coupled to the electrical machine; a second accessory drive train coupled to at least one accessory of the plurality of accessories and configured to drive the at least one accessory; and means for transmitting power from the first accessory drive train to the second accessory drive train.

4. The vehicle of claim 3, wherein the first accessory drive train is a gear drive.

5. The vehicle of claim 3, wherein the first accessory drive train is coupled to at least another accessory of the plurality of accessories and configured to drive the at least another accessory.

6. The vehicle of claim 3, wherein the second accessory drive train is a belt drive.

7. The vehicle of claim 3, wherein the means for transmitting includes a shaft coupling the second accessory drive train to the first accessory drive train and operative to supply power from the first accessory drive train to the second accessory drive train.

8. The vehicle of claim 1, wherein the accessory drive system is coupled to both the clutch and the electrical machine.

9. The vehicle of claim 1, wherein the electrical machine is configured to both convert mechanical power to electrical power and to convert electrical power to mechanical power.

10. A hybrid drive system for powering a drive train, comprising:
  a transmission;
  an electrical machine coupled to the drive train and operative to transmit power to the drive train, wherein the electrical machine is directly coupled to the transmission without an intervening clutch;
  a combustion engine arranged to transmit power to the drive train in series with the electrical machine;
  a clutch; and
  an accessory drive system, coupled to the electrical machine and configured to drive at least one accessory,
  wherein the hybrid drive system is configured to operate the clutch to supply mechanical power to the accessory drive system from a selected one or both of the electrical machine and the combustion engine.

11. The hybrid drive system of claim 10, wherein the hybrid drive system is configured to selectively supply mechanical power to the drive train from a selected one or both of the electrical machine and the combustion engine.

12. The hybrid drive system of claim 10, wherein the hybrid drive system is configured to start the combustion engine using the electrical machine.

13. The hybrid drive system of claim 10, wherein the hybrid drive system is configured to selectively engage and disengage the combustion engine from the electrical machine.

14. The hybrid drive system of claim 10, wherein the clutch is configured to selectively engage and disengage the combustion engine from the electrical machine, wherein the hybrid drive system is configured to supply mechanical power to the accessory drive system from the combustion engine by engaging the clutch; and wherein the hybrid drive system is configured to supply mechanical power to the accessory drive system from the electrical machine by disengaging the clutch.

15. The hybrid drive system of claim 10, wherein the accessory drive system is configured to drive a plurality of accessories.

16. The hybrid drive system of claim 15, wherein the accessory drive system is bifurcated into a first accessory drive train and a second accessory drive train; wherein the accessory drive system is configured to drive a first subset of the plurality of accessories with the first accessory drive train; and wherein the accessory drive system is configured to drive a second subset of the plurality of accessories with the second accessory drive train.

17. The hybrid drive system of claim 16, wherein the first subset includes a gear-driven accessory; wherein the second subset includes a belt-driven accessory; wherein the first accessory drive train includes a gear drive configured to drive the gear-driven accessory; and wherein the second accessory drive train includes a belt drive configured to drive the belt-driven accessory.

18. A hybrid drive system, comprising:
  a transmission;
  an electrical machine directly coupled to the transmission without an intervening clutch;
  a combustion engine arranged in series with the electrical machine;
  an accessory drive system coupled to the electrical machine and configured to drive at least one accessory; and
  means for directing mechanical power to the accessory drive system when the combustion engine is running and for directing mechanical power to the accessory drive system when the combustion engine is not running.

19. The hybrid drive system of claim 18, wherein the means for directing includes a clutch disposed between the combustion engine and the electrical machine, wherein the hybrid drive system is configured to supply mechanical power to the accessory drive system from the combustion engine by engaging the clutch; and wherein the hybrid drive system is configured to supply mechanical power to the accessory drive system from the electrical machine by disengaging the clutch.

20. The hybrid drive system of claim 19, wherein the clutch is configured to selectively engage and disengage the combustion engine from the electrical machine.

21. The vehicle of claim 1, wherein the clutch is nested within the electrical machine.

22. The hybrid drive system of claim 10, wherein the clutch is nested within the electrical machine.

23. The hybrid drive system of claim 18, wherein the means for directing is nested within the electrical machine.

* * * * *